(12) United States Patent
Rutz et al.

(10) Patent No.: US 7,594,705 B2
(45) Date of Patent: Sep. 29, 2009

(54) TRACK ROLLER ASSEMBLY FOR THE CRAWLER CHAIN OF A CRAWLER CHASSIS

(75) Inventors: Werner Rutz, Queidersbach (DE); Ingo Noeske, Zweibruecken (DE); Alfons Weckbecker, Zweibruecken (DE)

(73) Assignee: Terex-Demag GmbH & Co. KG, Zweibruecken (DE)

( * ) Notice: Subject to any disclaimer, the term of this patent is extended or adjusted under 35 U.S.C. 154(b) by 141 days.

(21) Appl. No.: 11/629,549

(22) PCT Filed: Jun. 14, 2005

(86) PCT No.: PCT/EP2005/006356

§ 371 (c)(1),
(2), (4) Date: Dec. 14, 2006

(87) PCT Pub. No.: WO2005/123490

PCT Pub. Date: Dec. 29, 2005

(65) Prior Publication Data

US 2008/0185911 A1    Aug. 7, 2008

(51) Int. Cl.
  B60G 5/00    (2006.01)
  B62D 55/14   (2006.01)
(52) U.S. Cl. ..................... 305/133; 305/193
(58) Field of Classification Search ............. 305/107, 305/116, 129, 132, 133, 142, 193, 138
See application file for complete search history.

(56) References Cited

U.S. PATENT DOCUMENTS 1,725,817 A * 8/1929 Mitchell .................. 305/132
2,113,018 A * 4/1938 Fergusson ................ 305/163

(Continued)

FOREIGN PATENT DOCUMENTS

CN    2070705    2/1991

(Continued)

OTHER PUBLICATIONS

English Language Summary of Relevance of Ducument furnished as attachment to this IDS in compliance with MPEP 609.04(a), p. 600-153.

*Primary Examiner*—S. Joseph Morano
*Assistant Examiner*—Kip T Kotter

(57) ABSTRACT

The invention refers to a truck roller assembly (12) for a crawler chain comprising at least two spaced track roller portions (5, 5') with running surfaces for running on the crawler chain (13), and a star-shaped element (6) for guiding the track roller assembly (12) on the crawler chain (13). The star-shaped element (6) is mounted freely rotatably between the at least two track roller portions (5, 5'), and it is provided with a plurality of teeth (6', 6", 6''', 6'''', 6'''''). The teeth (6', 6", 6''', 6'''', 6''''') co-operate with the crawler chain (13) in such a way that on rolling over chain links (3) of the crawler chain (13) they engage into corresponding gaps (8) in the crawler chain (13). The teeth (6', 6", 6''', 6'''', 6''''') extend beyond the running surfaces of the at least two track roller portions (5, 5') and between projections (7, 7') of the crawler chain (13) such that it is ensured that the crawler chain (13) Is not displaced laterally relative to the track roller portions (5, 5') and does not roll up on to the projections (7) of the crawler chain (13). In an alternative embodiment the star-shaped element is replaced by an idling roller (11).

7 Claims, 4 Drawing Sheets

U.S. PATENT DOCUMENTS

| | | | |
|---|---|---|---|
| 2,466,068 A | 4/1949 | Archer et al. | |
| 3,504,951 A * | 4/1970 | Hirych | 305/102 |
| 3,776,326 A * | 12/1973 | Davin et al. | 180/9.1 |
| 4,458,955 A * | 7/1984 | Webb | 305/133 |
| 5,482,364 A * | 1/1996 | Edwards et al. | 305/157 |
| 6,712,549 B2 | 3/2004 | Roth | |
| 6,726,293 B2 | 4/2004 | Anderton et al. | |
| 2004/0026996 A1 | 2/2004 | Woody et al. | |

FOREIGN PATENT DOCUMENTS

| | | |
|---|---|---|
| DE | 36 03 261 | 2/1986 |
| DE | 296 16 953 | 1/1998 |
| DE | 196 40 145 | 4/1998 |
| DE | 100 36 367 | 7/2000 |
| DE | 101 32 903 | 7/2001 |
| JP | 61 064 588 | 4/1986 |
| JP | 5 039 065 | 2/1993 |
| JP | 92 54 836 | 9/1997 |
| JP | 100 35 549 | 2/1998 |
| JP | 101 19 834 | 5/1998 |

\* cited by examiner

PRIOR ART

TRACK ROLLER ASSEMBLY FOR THE CRAWLER CHAIN OF A CRAWLER CHASSIS

TECHNICAL FIELD

The present invention generally concerns a track roller assembly for the crawler chain of a crawler chassis and a crawler chassis for a crawler vehicle, in particular for a crane, which has said track roller assembly.

BACKGROUND OF THE INVENTION

Usually crawler chains comprising chain links are guided between two track rollers. If a crane or an excavator with a crawler chassis with a crawler chain is moved on uneven terrain, problems can arise however, particularly in the case of depressions and holes in the ground. If the crane for example is turned on the spot and in that case the crawler chain sags in the centre precisely at the location of the depression in the ground, then the situation can occur where the track roller rides up on to the projection of the crawler chain. The projections of the crawler chain usually serve for guiding the crawler chain between the track rollers.

The same thing can occur if the crane turns on slightly inclined terrain In this case also there is the danger of the crawler chain being positioned inclinedly relative to the track roller, whereby the track roller can ride up on to the projection of the crawler chain as the track roller, by way of the projections, entrains the ground-engaging plate of the crawler chain, but that remains on the ground.

In the situations just discussed above therefore the crawler chain and the track rollers can suffer from damage, although various approaches are already known in this respect for reducing the loadings on the crawler chains and wear thereof.

Thus for example DE 100 36 367 A1 describes a crawler chassis which has a crawler carrier and at least one drive tumbler which can be fixed thereto, an idler wheel, an endless chain, a plurality of track rollers arranged at the lower run, and a direction-changing roller mounted in a mounting support. In order to alleviate stress peaks on the endless chain and thus to be able to prolong the service life of the crawler chain or reduce the wear thereof, the direction-changing roller is supported resiliently. That however only resolves the problem of avoiding high loadings on the crawler chain when rigging the crane insofar as a rigid arrangement of the drive tumbler and the idler wheel is used and the stress peaks which occur in that situation are reduced.

DE 36 03 261 A1 describes a further crawler chassis for bulldozers, loading crawler tractors or the like, wherein the aim is to resolve the problem of maintenance of the mountings of the running gear frame of the crawler chassis. Spherical mountings are used for that purpose, which are intended to reduce shock loadings on the chassis and achieve good damping. However loadings which act directly on the crawler chain are not addressed.

In addition DE 101 32 903 A1 discloses a crawler chassis for excavators, in particular for large hydraulic excavators, which has a crawler carrier accommodating a crawler chain, at least one chain wheel and at least one idler wheel, between which the crawler chain is guided if required by way of guide elements and over which the crawler chain can be deflected, and at least one tensioning element for the crawler chain. That arrangement is intended to reduce wear of the crawler chain. For that purpose the idler wheel is of a larger diameter than the chain wheel and the crawler chain is guided in the upper run substantially rectilinear between the idler and chain wheels. However, here too no solution is put forward, which would make it possible to avoid damage to the crawler chain and the track wheels if the crawler chassis is used on sloping or uneven terrain so that there is the danger of the track wheels running up on to the projections of the crawler chain.

JP 09254836 A shows a rolling wheel for a rubber crawler. Here, a pair of disk-like rolling members is disposed on a rolling wheel and arranged such that the rolling members roll beside projections of the rubber crawler. The rolling members have inclined surfaces formed according to the inclination of the sides of the projections. The rolling members are adapted to freely rotate coaxially with the rotating shaft of the rolling wheel, and installed opposite to the right and left sides of the projections. Accordingly, if lateral forces act between the rolling wheel and the rubber crawler, the side surface of the projections and the rolling members come into contact with each other, and the contact force can be softened because the rolling members are freely rotateable, though that the mutual abrasion can be reduced.

In U.S. Pat. No. 6,726,293 B2 a star carrier roller assembly is disclosed used in certain tracked mobile machines. The shown star carrier roller assembly includes a carrier roller positioned adjacent to a sprocket having a plurality of teeth. The sprocket is attached to the carrier roller to ensure rotation of the carrier roller even if undesirable substances become attached quite often inhibiting rotation of the carrier rollers. Such a stair carrier roller assembly should limit the wear of the carrier roller.

JP 05039065 A shows a wheel slip-off preventing mechanism for a rubber crawler. Here, a wheel slip-off preventing mechanism comprises a supporting part perpendicular to the longitudinal direction of a rubber crawler. The supporting part is installed on machine body, and a swing member which can move at least in the vertical direction is fitted on the supporting part. The swing member is installed between a pair of angular parts projecting on the inner peripheral surface of the rubber crawler or having the angular part interposed. The supporting part is a shaft body, and the swing member fitted on the; shaft body is fitted with a free hole having a large diameter than the thickness of the shaft body. The swing member travels in contact with the inner peripheral surface of the rubber crawler, and even in the case with the rubber crawler and the machine body are relatively separated in comparison with the contacting travelling, the swing can follow the rubber crawler inside.

A crawler belt slippage preventing structure is disclosed in JP 10035549 A. This known crawler belt slippage preventing structure comprises a plurality of Y-shaped branched crawler belt slippage preventing projections formed in the center part of a crawler belt. A pair of front and rear lower side rolling wheels is arranged in the lower part of a frame through a rolling wheel swing motion supporter. Projecting fitting recess parts in which the crawler belt slippage preventing projections are fitted, are formed between rolling wheel main bodies. An elastic crawler belt slippage preventing body is suspended between a pair of front and rear rolling wheel supporting boss parts of the rolling wheel swing motion supporter. A swelled part of the crawler belt slippage preventing body is arranged between the crawler belt slippage preventing projections and brought into contact with the inner circumferential surface of the crawler belt main body, so that the crawler belt can be prevented from being slipped from the lower side rolling wheels.

JP 10119834 A shows a running crawler guide. The running crawler guide comprises a pair of front rolling wheels and a pair of rear rolling wheels. Each pair of rolling wheels is vertically movable. A vertically movable guiding body is provided between the front and rear rolling wheels. The guiding body projects between projections formed on the rail of the crawler track.

Finally, JP 61064588 A shows a track roller of a crawler travelling apparatus. Outer collars are integrally formed onto the both outer sides of a roller and arranged so as to be positioned onto the both outer sides of a pair of projections arranged in parallel on the rail of the crawler at the center of a crawler. A middle collar is concentrically formed integrally with the both outer collars so as to be positioned in the cavity between the pair of projections.

SUMMARY OF THE INVENTION

In accordance with a first aspect of the invention there is provided a track roller assembly for a crawler chain, the track roller assembly being adapted to be mounted in a crawler carrier. The inventive track roller assembly comprises at least two spaced track roller portions with running surfaces for running on the crawler chain, and a star-shaped element for guiding the track roller assembly on the crawler chain. The star-shaped element is mounted freely rotatably between the at least two track roller portions, and provided with a plurality of teeth, wherein the teeth co-operate with the crawler chain in such a way that on rolling over chain links of the crawler chain they engage into corresponding gaps in the crawler chain. The teeth extend beyond the running surfaces of the at least two track roller portions and between projections of the crawler chain such that it is ensured that the crawler chain is not displaced laterally relative to the track roller portions and does not roll up on to the projections of the crawler chain.

The provision of the star-shaped element provides that it is possible to avoid the track roller portions running up on to the projections on the crawler chain when the chain experiences inclined positioning on uneven terrain or sags over a depression in the ground. The star-shaped element holds the track roller assembly on the correct line in addition to guidance for the track roller portions by the projections of the crawler chain so that when the crawler carrier moves downwardly on to the chain links of the crawler chain the track roller portions remain in the guidance of the projections and cannot run up thereonto. It is possible in that way to avoid excessive wear and also damage to the crawler chain and to the track rollers which can occur as a consequence of such interim situations. The service life of the crawler chain can be prolonged in that way, whereby the operating costs of the excavator or crane which has the track roller assembly according to the invention can also be reduced. Due to the fact that the star-shaped wheel is supported freely rotatably the crawler chain drives the star-shaped element independently from the track roller portions such that even if the track roller portions do not rotate a suitable guidance is ensured.

It is thus possible, in the case of a crawler chain, to use low projections without the track roller portions being able to run beyond the projections. Low projections afford the advantage that the radius for the transmission of the drive torque from the vehicle transmission to the chain is small, that is to say the forward drive force is high. In addition it is thus also possible for the transmissions, the track rollers and the drive wheels to be produced inexpensively.

As already mentioned above, in accordance with the invention the star-shaped element is mounted freely rotatably on a shaft. When the crane or the excavator or another vehicle which uses the track roller assembly for a crawler chain of a crawler chassis moves, the crawler carrier with the star-shaped element and the track roller portions moves relative to the chain links of the crawler chain, which rest on the ground. As a result, the star-shaped element experiences a force component by way of one of the chain links of the crawler chain so that the star-shaped element rotates on the shaft which is common to the track roller assemblies.

The star-shaped element may have the form of for example a star wheel. In accordance with an aspect of the invention the star-shaped element is provided with prongs or teeth which form guide means. The star-shaped element can have five teeth; it is however also possible to provide any other configuration which is suitable for co-operating with corresponding recesses or gaps in the crawler chain.

In accordance with a further aspect of the invention it is provided a track roller assembly for a crawler chain, the track roller assembly being adapted to be mounted in a crawler carrier. This track roller assembly comprises at least two spaced track roller portions with running surfaces for running on the crawler chain and an idling roller for guiding the track roller assembly on the crawler chain. The idling roller is mounted in front of the at least two track roller portions and the idling roller is pivotally mounted on a shaft and remains in contact with the crawler chain such that it is ensured that the crawler chain is not displaced laterally relative to the track roller portions and does not roll up on to the projections of the crawler chain. The idling roller afford security and stability in order to guarantee tracking truth with only a slight level of chain play.

In accordance with a further aspect of the invention the idling roller can rotate freely on the common shaft with the track roller portions. Upon displacement of the crane the crawler carrier with the idling roller and the track roller portions moves relative to the chain links which are resting on the ground. If now the crawler chain is sagging or if a chain link of the crawler chain, for example the base plate, is in an inclined position relative to the track roller portions, the idling roller ensures that the crawler chain is not displaced laterally relative to the track roller portions and does not run up on to the projections.

In accordance with still a further aspect of the present invention the idling roller is in the form of a pair of rollers which can rotate freely on a front shaft of the track roller portions. The pair of rollers stabilises the track roller portions and gives additional security for ensuring tracking fidelity of the track roller assembly on the crawler chain. In particular, the pair of rollers can rotate freely on a front shaft and can be pivotally arranged on the shaft which extends through the track roller portions. In the situation where the chain sinks, the pair of rollers moves downwardly. In that case, guidance for the chain is still maintained by virtue of the fact that the projections of the chain are still guided between the two rollers of the pair of rollers. In that case the rollers of the first guide means are preferably so arranged that they can carry lateral forces of the chain.

In accordance with a further aspect of the invention, there is provided a crawler chassis for example a lattice jib crane. The crawler chassis comprises a crawler carrier, a crawler chain having two rows of projections provided on an inside of the crawler chain, and at least one track roller assembly including at least two track roller portions with running surfaces for running on the crawler chain besides the two rows of projections, and a star-shaped element mounted freely rotatably on a shaft on the crawler carrier of the crawler chassis between the at least two track roller portions. The star-shaped element of the at least one track roller assembly co-operates with the crawler chain to prevent lateral displacement of the crawler chain relative to the track roller assembly such that it is ensured that the crawler chain is not displaced laterally relative to the track roller portions and does not roll up on to the projections of the crawler chain.

The provision of a crawler chassis which has a track roller assembly as mentioned above again makes it possible to ensure that the track roller portions do not roll up on to the projections on the crawler chain when the chain experiences inclined positioning on uneven terrain or sags over a dip in the ground. That accordingly avoids wear of and damage to the crawler chain and the track roller portions.

In accordance with a further aspect of the invention a crawler chassis comprises a crawler carrier, a crawler chain having at least one row of projections provided on an inside of the crawler chain, at least one track roller assembly including at least two track roller portions with running surfaces for running on the crawler chain besides the at least one row of projections, and an idling roller for guiding the track roller assembly on the crawler chain. The idling roller is pivotally mounted with respect to the track roller portions and is arranged in front of the at least two track roller portions and is remaining in contact with the crawler chain such that it is ensured that the crawler chain is not displaced laterally relative to the track roller portions and does not roll up on to the projections of the crawler chain.

In a further exemplary embodiment of the present invention, the track roller assembly of the crawler chassis may have at least two track roller portions with running surfaces for running on the crawler chain and at least one track roller portion which is arranged axially between the at least two track roller portions and whose periphery is reduced in relation to the at least two track roller portions.

In accordance with a further aspect of the present invention the crawler chassis is of such a configuration that the maximal play between the star shaped element or the idling roller and the crawler chain is less than the maximal play between the track roller portions and the crawler chain.

In a further exemplary embodiment of the present invention, the idling roller has an outer peripheral surface which is formed such that the at least one row of projections of the crawler chain is laterally guided by the idling roller.

In a further exemplary embodiment of the present invention, two rows of projections are arranged in mutually spaced relationship on the crawler chain and the idling roller of the track roller assembly is in the form of a pair of rollers which can rotate freely on a front shaft and which are arranged with a gap between it. The two rollers are arranged such that the two rows of projections project into the gap between the two rollers.

In a further exemplary embodiment of the present invention, the at least two track roller portions are freely rotatably mounted on a shaft and the idling roller of the track roller assembly is pivotally mounted on the shaft.

In accordance with a still further aspect the crawler chassis is equipped with a crawler chain which is in the form of an endless chain.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

BRIEF DESCRIPTION OF THE DRAWINGS

Various embodiments of the invention are described hereinafter for further description and for improved understanding with reference to the accompanying drawings in which.

DESCRIPTION OF EMBODIMENTS BY WAY OF EXAMPLE OF THE PRESENT INVENTION

Figure 1:
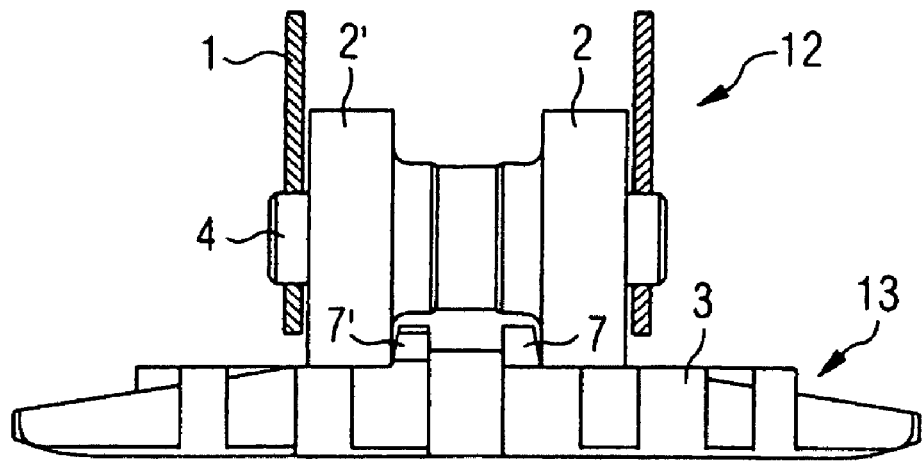
FIG. 1 shows a view in section through a known track roller assembly.

FIG. 1 shows a view in section of a known track roller assembly 12. A double track roller or a track roller comprising two track roller portions 2, 2' is mounted by way of a shaft 4 on a crawler carrier I of the crawler chassis. The track roller assembly 12 rests on a crawler chain 13 which is composed of individual chain links 3. The crawler chain 13 also has a pair of projections 7 and two rows of projections, respectively which are arranged in mutually spaced relationship on the inside, of the chain links 3. The spacing of the projections 7 is so selected that the projections can serve as a guide for the track roller portions 2, 2' so that the track roller portions 2, 2' run against the outside of the projections 7.

In FIG. 1 the crawler chain 13 is shown in a condition of lying flat on the ground, with the track roller assembly 12 being disposed in its correct position or tracking line with respect to the crawler chain 13 so that, upon movement of the vehicle with crawler drive such as for example a lattice jib crane (not further shown here) which uses that track roller assembly 12 or upon corresponding movement of the track roller assembly 12 on the crawler chain 13, it is not damaged or destroyed.

Figure 2:
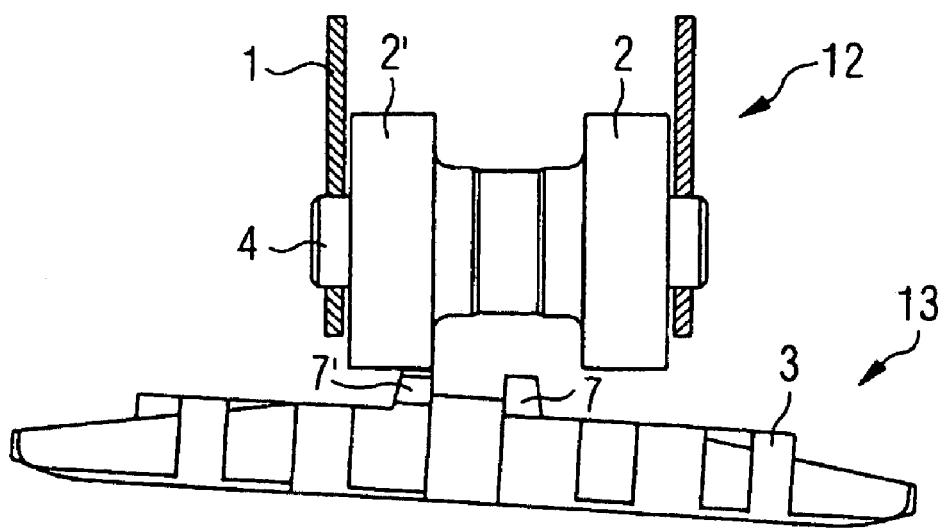
FIG. 2 shows a view in section through a known track roller assembly.
Figure 3:
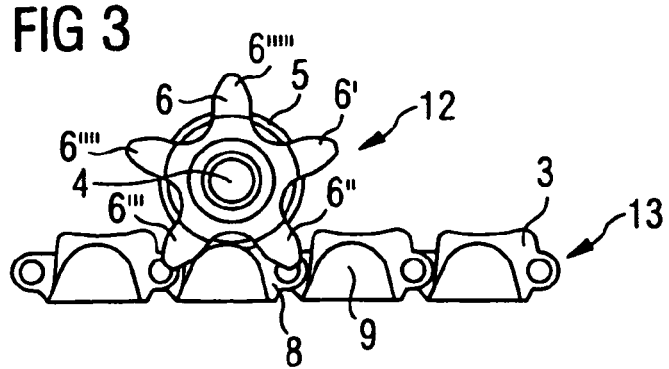
FIG. 3 shows a side view of the track roller assembly in accordance with an embodiment by way of example of the invention.
Figure 4:
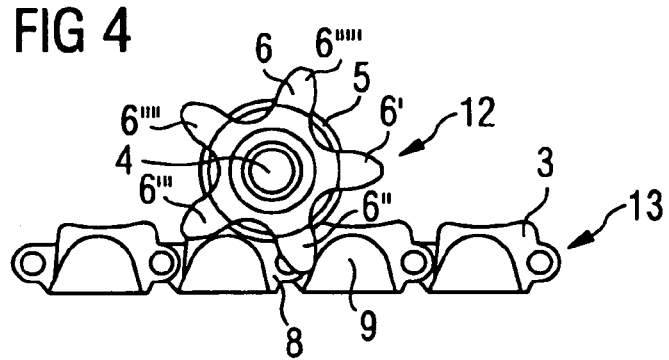
FIG. 4 shows a further side view of the track roller assembly shown in FIG. 3.
Figure 5:
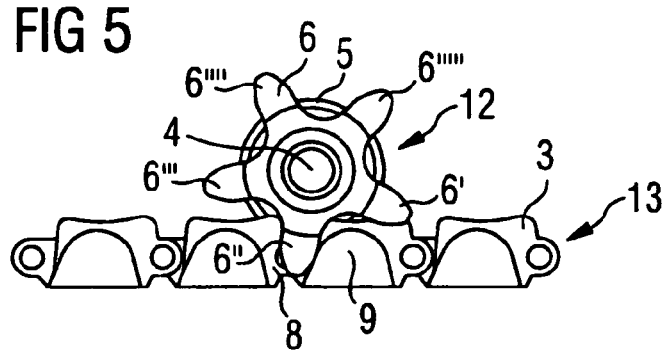
FIG. 5 shows a further side view of the track roller assembly shown in FIG. 3.
Figure 6:
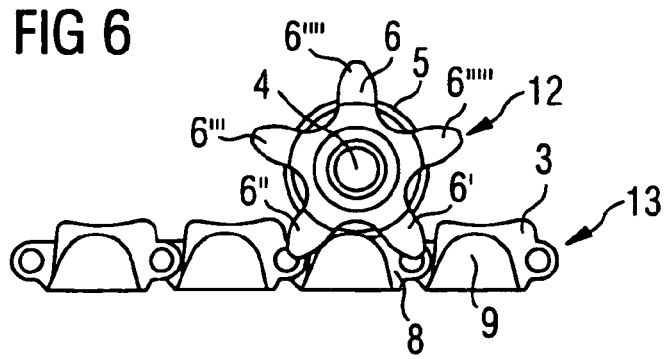
FIG. 6 shows a further side view of the track roller assembly shown in FIG. 3.

FIG. 2 shows the same known track roller assembly 12, but in this case the crawler chain 13 is in an inclined position, as can be the case for example on uneven terrain. In this situation the track roller portion 2' has rolled up on to the projection 7 of the crawler chain 13. In that condition, there can be both damage to the crawler chain 13 and also to the track roller portions 2, 2' of the track roller assembly 12.

FIG. 3 to 6 show a side view of an embodiment by way of example of the invention in a situation involving ongoing movement of the track roller assembly 12 relative to the crawler chain 13. The track roller assembly 12 has two track roller portions 5, 5' with running surfaces for running on the crawler chain 13. A further track roller portion 14 of reduced periphery is arranged axially between the two track roller portions 5, 5'. Arranged on the track roller portion 14 of reduced periphery and between the track roller portions 5, 5' is a star-shaped element 6 with five teeth 6', 6'', 6''', 6'''', 6'''''.

The star-shaped element 6 which for example can be in the form of a star wheel can rotate freely on the shaft 4. Upon displacement of a crane with a crawler chassis which has this track roller assembly 12, the crawler carrier I with the star-shaped element 6 and the track roller portions 5, 5' moves relative to the chain links 3 which are resting on the ground. As a result the star-shaped element 6 experiences a force component by way of the central portion 9 of the crawler chain 13 and thus rotates on the shaft 4.

The star-shaped element 6 is of such a configuration that, when rolling over the chain links 3, it repeatedly engages into the gaps 8 in the crawler chain 13. If the chain now sags, the star-shaped element 6 ensures that the crawler chain 13 is not displaced laterally relative to the track roller assemblies 5, 5' and does not roll up on to the projections.

Figure 7:
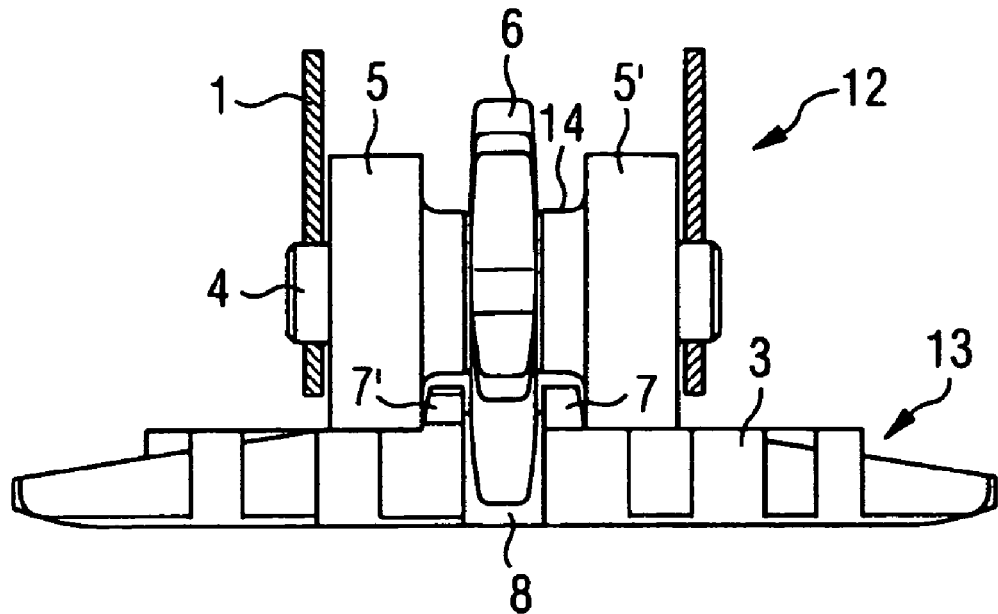
FIG. 7 shows a view in section of the track roller assembly in accordance with an embodiment by way of example of the invention.

FIG. 7 shows a view in section of the track roller assembly in accordance with the embodiment of the invention by way of example as illustrated in FIG. 3 to 6. The star-shaped element 6 is mounted on the track roller portion 14 of reduced periphery and on the shaft 4 on which the star-shaped element is mounted freely rotatably. The track roller portions 5, 5' can each be freely rotatably mounted, but they can also be screwed or welded together. It will be appreciated however that other mutual fixings for the track roller portions 5, 5' are also possible. The track roller portions 5, 5' however could also be integral or made in one piece.

Figure 8:
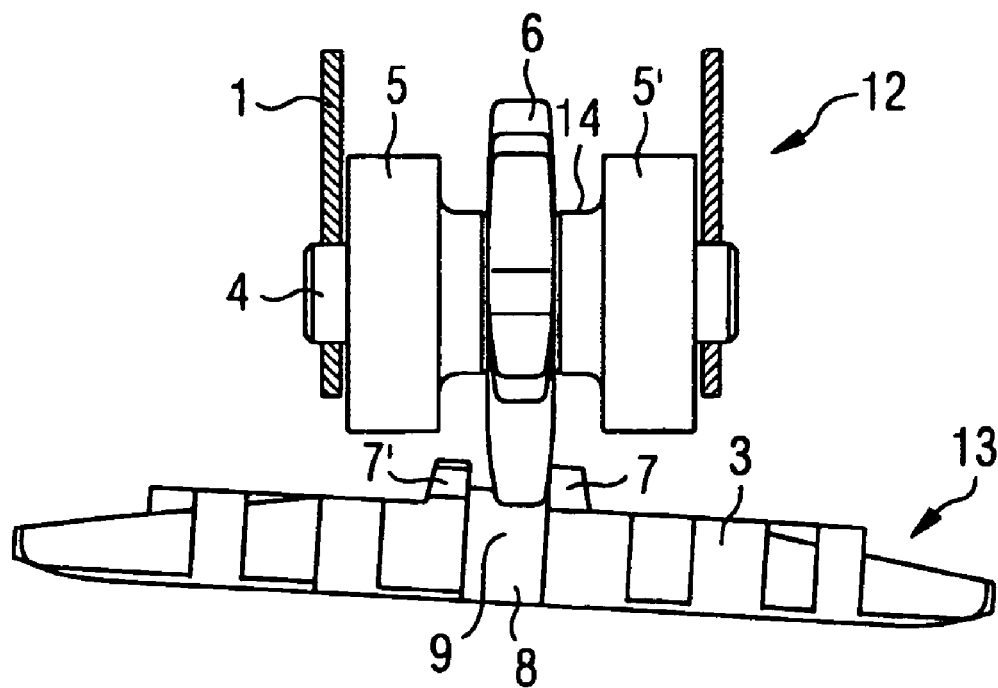
FIG. 8 shows a further view in section of the track roller assembly of FIG. 7.

In the condition shown in FIG. 7 the crawler chain 13 is resting on a flat surface. A tooth of the star-shaped element engages into a gap 8 between the chain links 3 of the crawler chain 13 and thereby holds the track roller assembly 12 exactly in its correct tracking alignment. By virtue of the invention however, as shown in FIG. 8, that is also the case on uneven terrain when the crawler chain 13 is in an inclined position. When the crawler carrier 1 moves downwardly, the teeth of the star-shaped element again engage into the next gap 8 and thus prevent the track roller portions 5, 5' from running up on to the projections 7, 7'. In addition the play between the star-shaped element and the crawler chain 13 is less than the play between the track roller portions 5, 5'.

Figure 9:
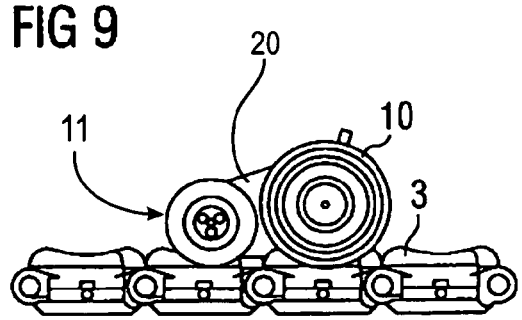
FIG. 9 shows a side view of a further embodiment by way of example of the invention.

FIG. 9 to 12 show a further embodiment of the invention by way of example thereof. In this respect FIG. 9 is a side view of a track roller assembly 12 which co-operates with the crawler chain 13 and which uses an pivotally mounted idle or idling roller 11 as a guide means. The idling roller 11 comprises two roller parts 11',11" arranged to rotate freely on front shaft 15 and spaced such that projections 7, 7' on the crawler chain project between the two roller parts (see e.g. FIGS. 10 & 12). The idling roller 11 is rotatably mounted on a lever 20 (FIGS. 9 and 11) pivoting around shaft 4. A spring biases the idling roller 11 against the crawler chain such that the idling roller 11 always is in contact with the rail (inner surface)of the crawler chain 13.

Figure 10:
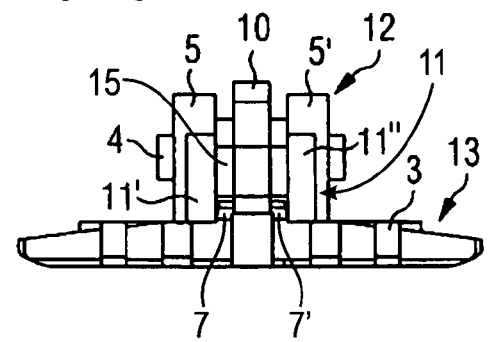
FIG. 10 shows a view in section of the embodiment shown in FIG. 9.

It can be seen from FIG. 10 the idling roller 11 comprises a pair of rollers 11', 11". The pair of rollers 11', 11" is arranged in front of and to the right and the left of projections 7, 7' of the crawler chain 13. Two track roller portions 5, 5' are supported freely rotatably on the shaft 4 and normally roll on the rail (innersurface) of the crawler chain 13 besides the projections 7, 7'.

In this case the crawler chain 13 is disposed on flat ground so that the track roller assembly is in the correct position, that is to say the projections 7, 7' of the crawler chain 13 are enclosed at their respective outsides by the rollers 11', 11" so that they serve as guides.

Figure 11:
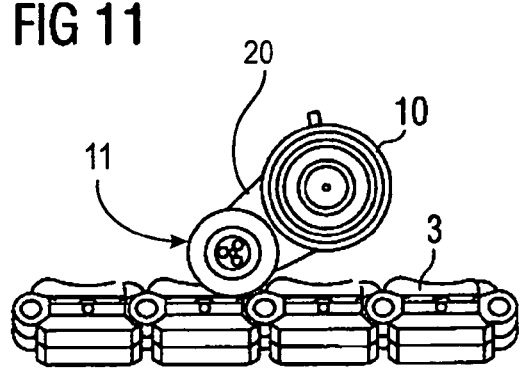
FIG. 11 shows a further side view of the embodiment shown in FIG. 9.
Figure 12:
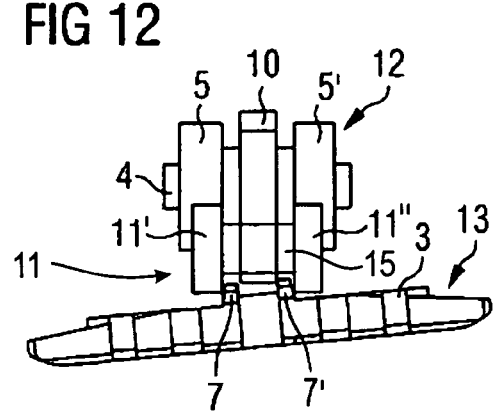
FIG. 12 shows a further view in section of the embodiment shown in FIG. 9.

FIG. 11 and 12 show the mode of operation of the embodiment of FIG. 10 when the crawler chain 13 is in an inclined position, for example when the vehicle is used on uneven terrain. The idling roller 11 (comprising the rollers 11', 11") is of such a configuration and dimensions that the rollers 11', 11" ran outside the projections 7, 7'. Thus, upon downward movement of the crawler carrier 1 the track roller assembly 12 will be certain to encounter the chain links 3 in the correct position on the crawler chain 13. This arrangement also ensures that the chain cannot be displaced laterally relative to the track roller portions 5, 5'. In that way it is possible to reliably avoid excessive wear and damage to the crawler chain.

LIST OF REFERENCES 1 crawler carrier
2,2' track roller portions
3 chain links
4 shaft
5,5' track roller portions
6 first guide means
6'-6'''' teeth
7, 7' projection
8 gap
9,9' projection
10 roller
11 idling rollers
11', 11" roller parts
12 track roller assembly
13 crawler chain
14 track roller portion of reduced periphery
15 front shaft

The invention claimed is:

1. A track roller assembly for a crawler chain having at least one row of projections provided on an inner surface of said crawler chain, said track roller assembly being adapted for mounting in a crawler carrier, said track roller assembly comprising:
at least two spaced track roller portions mounted on a shaft having a center axis coinciding with a roller axis of the respective track roller portions, said at least two spaced track roller portions comprising running surfaces for running on said crawler chain, wherein the track roller assembly rests on the crawler chain, and
idling means for guiding said track roller assembly on said crawler chain,
wherein said idling means is mounted in front of said at least two spaced track roller portions,
wherein said idling means is pivotally mounted on said shaft, so that said idling means is pivotal about the center axis of the shaft, and
wherein said idling means is operatively arranged for remaining in contact with a run of said crawler chain, on which the running surfaces rest, to avoid lateral displacement relative to said two spaced track roller portions or roll up on to the at least one row of projections of said crawler chain.

2. The track roller assembly according to claim 1, wherein said idling means comprises a pair of rollers rotatably mounted on a front shaft positioned in front of the at least two track roller portions.

3. A crawler chassis comprising:

a crawler carrier, a crawler chain having at least one row of projections provided on an inner surface said crawler chain, at least one track roller assembly comprising at least two track roller portions with surfaces for running on said crawler chain besides said at least one row of projections, wherein the at least two track roller portions of a track roller assembly have a common roller axis, wherein the at least one track roller assembly rests on the crawler chain, and idling means for guiding said track roller assembly on said crawler chain, wherein said idling means is pivotally mounted with respect to the track roller portions, so that said idling means is pivotal about the common roller axis of the at least two track roller portions, and wherein said idling means is arranged in front of said at least two track roller portions, and wherein said idling means remains in contact with a run of said crawler chain, on which the surfaces for running rest, to avoid lateral displacement relative to the track roller portions or roll up on to said at least one row of projections of said crawler chain.

4. The crawler chassis according to claim 3, wherein said idling means comprises an idling roller having an outer peripheral surface operatively arranged such that said at least one row of projections of the crawler chain is laterally guided by said idling roller.

5. The crawler chassis according to claim 4, comprising two rows of projections arranged in mutually spaced relationship on said crawler chain and said idling roller of said track roller assembly is in the form of a pair of rotatable rollers on a front shaft arranged with a gap therebetween, wherein said rollers are operatively arranged such that the two rows of projections enter into said gap.

6. The crawler chassis according to claim 3, further comprising a shaft, wherein said at least two track roller portions are rotatably mounted on said shaft and the idling means of the track roller assembly is pivotally mounted on said shaft.

7. The crawler chassis according to claim 3, wherein said crawler chain is an endless chain.

* * * * *